(12) United States Patent
Monroy Aripez et al.

(10) Patent No.: US 12,214,480 B2
(45) Date of Patent: Feb. 4, 2025

(54) POWER TOOL (71) Applicant: Robert Bosch GmbH, Stuttgart (DE)

(72) Inventors: Agustin Monroy Aripez, Santa Veronica (MX); Balazs Nagy, Roselle, IL (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/249,436

(22) PCT Filed: Oct. 1, 2021

(86) PCT No.: PCT/EP2021/077098
§ 371 (c)(1),
(2) Date: Apr. 18, 2023

(87) PCT Pub. No.: WO2022/089873
PCT Pub. Date: May 5, 2022

(65) Prior Publication Data
US 2023/0415326 A1 Dec. 28, 2023

Related U.S. Application Data

(60) Provisional application No. 63/106,470, filed on Oct. 28, 2020.

(51) Int. Cl.
*B25F 5/02* (2006.01)
*H01M 50/247* (2021.01)
(52) U.S. Cl.
CPC ............. *B25F 5/02* (2013.01); *H01M 50/247* (2021.01); *H01M 2220/30* (2013.01)
(58) Field of Classification Search
CPC ......... B25F 5/02; H01M 50/20; H01M 10/48; H01M 2/10
See application file for complete search history.

(56) References Cited

U.S. PATENT DOCUMENTS

2008/0099224 A1 5/2008 Hofmann et al.
2008/0302552 A1 12/2008 Kondo
(Continued)

FOREIGN PATENT DOCUMENTS

CN 203205475 U 9/2013
CN 107492610 A 12/2017
(Continued)

OTHER PUBLICATIONS

International Search Report corresponding to PCT Application No. PCT/EP2021/077098, mailed Dec. 20, 2021 (4 pages).

*Primary Examiner* — Nathaniel C Chukwurah
(74) *Attorney, Agent, or Firm* — Maginot, Moore & Beck LLP (57) ABSTRACT

A power tool has a housing. The housing includes a battery pack attachment area. The battery pack attachment area comprises a battery pack insertion direction, a battery pack insertion opening and an end portion opposite from the battery pack insertion opening in the battery pack insertion direction. The end portion extends across the battery pack insertion direction and has at least one first contact surface for a forward portion of an inserted battery pack. Battery pack guide sections extend parallel to the battery pack insertion direction between the battery pack insertion opening and the end portion and that are spaced apart from each other. The battery pack attachment area comprises an insert which extends along the end portion and includes the at least first contact surface.

20 Claims, 5 Drawing Sheets

(56) References Cited

U.S. PATENT DOCUMENTS

| | | |
|---|---|---|
| 2010/0224666 A1 | 9/2010 | Miyata |
| 2012/0171539 A1 | 7/2012 | Rejman et al. |
| 2013/0149581 A1 | 6/2013 | Yoshikawa |
| 2013/0196203 A1 | 8/2013 | Wackwitz et al. |
| 2014/0294483 A1 | 10/2014 | Hanawa et al. |
| 2014/0326477 A1 | 11/2014 | Thorson et al. |
| 2015/0104250 A1 | 4/2015 | Tada et al. |
| 2015/0214520 A1 | 7/2015 | Nishikawa et al. |
| 2015/0343617 A1 | 12/2015 | Kondo et al. |
| 2015/0357612 A1 | 12/2015 | Uchida et al. |
| 2016/0359151 A1 | 12/2016 | Beyerl et al. |
| 2017/0373288 A1 | 12/2017 | Klee et al. |
| 2018/0126534 A1 | 5/2018 | Iida et al. |
| 2018/0193995 A1 | 7/2018 | Runau |
| 2018/0304454 A1 | 10/2018 | Kawakami et al. |
| 2018/0370014 A1 * | 12/2018 | Roehm ............... B25F 5/02 |
| 2019/0001477 A1 | 1/2019 | Ullrich et al. |
| 2019/0210207 A1 | 7/2019 | Ren et al. |
| 2019/0372182 A1 | 12/2019 | Takayasu |
| 2019/0381649 A1 | 12/2019 | Peng et al. |
| 2020/0295506 A1 | 9/2020 | Marx et al. |
| 2021/0057686 A1 | 2/2021 | Qiao |
| 2021/0237249 A1 | 8/2021 | Fischer et al. |
| 2021/0288370 A1 | 9/2021 | Rejman et al. |
| 2022/0285774 A1 | 9/2022 | Muir |
| 2023/0021944 A1 | 1/2023 | Petrus |
| 2023/0034090 A1 | 2/2023 | Richards |

FOREIGN PATENT DOCUMENTS

| | | | |
|---|---|---|---|
| CN | 206864525 U | 1/2018 | |
| CN | 208468214 U | 2/2019 | |
| CN | 110185741 A | 8/2019 | |
| CN | 210182452 U | 3/2020 | |
| CN | 211700363 U | 10/2020 | |
| CN | 112688013 A | 4/2021 | |
| CN | 215395062 U | 1/2022 | |
| CN | 216830113 U | 6/2022 | |
| DE | 10 2013 201 504 A1 | 7/2014 | |
| DE | 20 2017 105 258 U1 | 10/2017 | |
| DE | 102017210467 A1 * | 12/2018 | ............... B25F 5/00 |
| DE | 10 2017 217 480 A1 | 4/2019 | |
| DE | 10 2021 115 105 A1 | 12/2022 | |
| EP | 3 120 977 A1 | 1/2017 | |
| GB | 2 432 036 | 5/2007 | |
| JP | H10-296660 A | 11/1998 | |
| JP | 2000-156212 A | 6/2000 | |
| JP | 2001-325932 A | 11/2001 | |
| JP | 2006-263830 A | 10/2006 | |
| JP | 2008-10315 A | 1/2008 | |
| JP | 2013-63494 A | 4/2013 | |
| JP | 2014-38717 A | 2/2014 | |
| JP | 2014-38718 A | 2/2014 | |
| JP | 2017-80827 A | 5/2017 | |
| KR | 20-0477687 Y1 | 7/2015 | |
| KR | 10-2022-0010626 A | 1/2022 | |
| WO | 2012/005159 A1 | 1/2012 | |
| WO | 2018/036720 A1 | 3/2018 | |
| WO | 2019/058933 A1 | 3/2019 | |
| WO | 2019/063210 A1 | 4/2019 | |
| WO | 2019/063212 A1 | 4/2019 | |
| WO | 2019/065088 A1 | 4/2019 | |
| WO | 2021/199816 A1 | 10/2021 | |

* cited by examiner

POWER TOOL

This application is a 35 U.S.C. § 371 National Stage Application of PCT/EP2021/077098, filed on Oct. 1, 2021, which claims the benefit of priority to Ser. No. U.S. 63/106,470, filed on Oct. 28, 2020 in the United States, the disclosures of which are incorporated herein by reference in their entirety.

This disclosure relates to the field of power tools, more particularly to battery operated power tools, and more particularly to battery operated oscillating power tools.

BACKGROUND

Oscillating power tools are lightweight, handheld tools configured to oscillate various accessory tools and attachments, such as cutting blades, sanding discs, grinding tools, and many others. The accessory tools and attachments can enable the oscillating power tool to shape and contour workpieces in a many different ways.

Oscillating power tools utilize small displacement, high frequency blade movement induced by an oscillating mechanism. Because of this movement, fine quality cuts can be made with high precision. The fine small movements are also resulting in an excellent cut finish and low dust release. The vibrations caused by the oscillation mechanism usually result in a sideways acceleration of the tool in relation to the output shaft with a very small displacement. The effect of these vibrations increases when it comes to cordless applications because the battery pack may not be completely rigidly attached to the tool body if it is a removable battery pack. The battery packs may also represent a significant weight in the system of a handheld power tool and usually reside at the opposite end of the tool away from the oscillating mechanism. As the tool oscillates, the battery pack, due to its inertia, is in a delayed movement following the tool's sideways acceleration. Due to this delay, there may be a relative movement between the tool and the battery pack. This relative movement may result in sliding of the contacting surfaces. Due to the nature of the high frequency vibrations, wear and heat build-up may occur between these surfaces. Since the displacement is small this wear and heat may get concentrated in a relatively small area and may cause materials to wear down relatively fast or melt. As a result, the outer shell of the battery pack and the tool contact surfaces can form a bond making the battery pack hard to remove from the tool.

There are multiple ways to deal with the situation, such as almost rigid battery pack mounting, so there is no relative movement. Due to the nature of manufacturing and accuracy class, it is typically not viable, in particular for consumer grade tools. In addition, contamination, such as drywall dust, could make the battery pack removal/insertion more difficult. Another option would be to actively cool the contact areas. But using forced cooling on such a small area would be expensive, in particular for hand held power tools.

SUMMARY

One aspect of this disclosure is directed to a power tool having a housing, the housing including a battery pack attachment area, the battery pack attachment area comprising a battery pack insertion direction; a battery pack insertion opening; an end portion opposite from the battery pack insertion opening in the battery pack insertion direction and extending across the battery pack insertion direction, the end portion having at least one first contact surface for a forward portion of an inserted battery pack; and battery pack guide sections that extend parallel to the battery pack insertion direction between the battery pack insertion opening and the end portion and that are spaced apart from each other; wherein the battery pack attachment area comprises an insert, the insert having at least a base segment extending along the end portion and including the at least first contact surface.

In some embodiments, the first contact surface protrudes from adjacent portions of the battery pack attachment area.

In some embodiments, the insert has two additional segments parallel to the battery pack insertion direction, extending away from the base segment and comprising at least parts of the battery pack guide sections adjacent to the end portion.

In some embodiments, the insert comprises two first contact surfaces and each first contact surface is arranged on the base segment adjacent the two additional segments.

In some embodiments, the additional segments are arranged on either side of a holder for battery pack contacts, the base segment extends along the holder and is arranged adjacent to the holder, and wherein the holder is arranged between the base segment and the battery pack insertion opening.

In some embodiments, the additional segments have second contact surfaces for guide sections of a battery pack and the second contact surfaces protrude from adjacent portions of the battery pack guide sections of the battery pack attachment area.

In some embodiments, the second contact surfaces are facing each other and the distance between the second contact surfaces is smaller than the distance between the remainders of the guide sections that extend between the additional segments and the battery pack insertion opening.

In some embodiments, the battery pack guide sections are arranged along first side walls of the battery pack attachment area, the battery pack attachment area further comprising a bottom portion extending between the first side walls, the battery pack insertion opening, and the end portion, wherein the battery pack guide sections and the bottom portion define grooves for battery pack rails, and wherein the distance between the additional segments and the bottom portion is smaller than the distance between the remainders of the battery pack guide sections and the bottom portion forming third contact surfaces for the rails of the battery pack.

In some embodiments, the first contact surface and the battery pack guide sections define an obtuse angle.

In some embodiments, the length of the two additional segments between the holder and the tips of the two additional segments is between 30% and 50% of the total length of the battery pack guide sections.

In some embodiments, the base segment has a first height and the additional segments have a second height and wherein the first height is bigger than the second height.

In some embodiments, the insert has pockets for insert retaining protrusions of the housing.

In some embodiments, the insert has a first pocket for insert retaining protrusions of the housing at the tip of each additional segment.

In some embodiments, the insert has an outer corner area on each side of the additional segment and the base segment and a second pocket in each of those outer corner areas.

In some embodiments, the insert has a third pocket on each additional segment between the first and second pocket.

In some embodiments, the battery pack attachment area is made from a first material and the insert is made from a second material, wherein the first material and the material of the portions of the battery pack that get in contact with each other have a first coefficient of friction, wherein the second material and the material of the portions of the battery pack that get in contact with each other have a second coefficient of friction, and wherein the first coefficient of friction is bigger than the second coefficient of friction.

In some embodiments, the material of the insert is one of polyoxymethylene (POM), acrylonitrile butadiene styrene (ABS), Polycarbonate/Acrylonitrile Butadiene Styrene (PC/PC), acrylic plastics, polycarbonate (PC), polycarbonate/poly ethylene (PC/PE), polyethylene terephthalate (PET), polypropylene (PP), polyvinyl chloride (PVC) and polytetrafluoroethylene (PTFE).

Another aspect of the disclosure is directed to a power tool having a housing, the housing including a battery pack attachment area made from a first material and comprising a battery pack insertion direction; a battery pack insertion opening; an end portion opposite from the battery pack insertion opening in the battery pack insertion direction and extending across the battery pack insertion direction, the end portion having at least one first contact surface for a forward portion of an inserted battery pack; and battery pack guide sections that extend parallel to the battery pack insertion direction between the battery pack insertion opening and the end portion and that are spaced apart from each other; wherein the at least first contact surface is made from a second material, wherein the first material and material of the battery pack that get in contact with each other have a first coefficient of friction, wherein the second material and material of the forward portion that get in contact with each other have a second coefficient of friction, and wherein the first coefficient of friction is greater than the second coefficient of friction.

In some embodiments of the other aspect, wherein the second material is an injection molded plate that extends along the at least one first contact surface and along parts of the battery pack guide sections adjacent to the at least one first contact surface.

In some embodiments of the other aspect, the second material is one of polyoxymethylene (POM), acrylonitrile butadiene styrene (ABS), Polycarbonate/Acrylonitrile Butadiene Styrene (PC/PC), acrylic plastics, polycarbonate (PC), polycarbonate/poly ethylene (PC/PE), polyethylene terephthalate (PET), polypropylene (PP), polyvinyl chloride (PVC) and polytetrafluoroethylene (PTFE).

The above aspects of this disclosure and other aspects will be explained in greater detail below with reference to the attached drawings.

DETAILED DESCRIPTION

The illustrated embodiment is disclosed with reference to the drawings. However, it is to be understood that the disclosed embodiment is intended to be merely an example that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
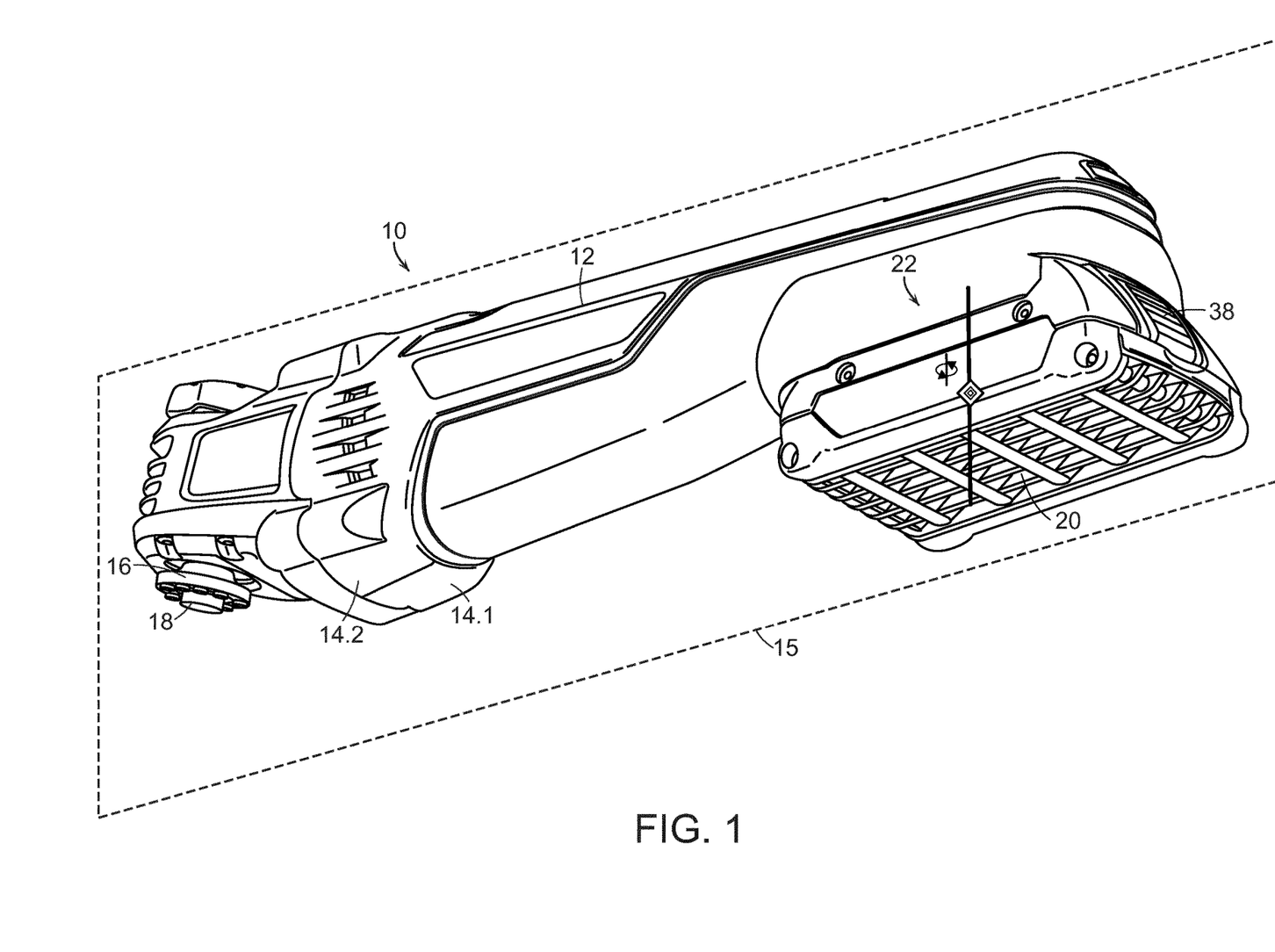
FIG. 1 is a first perspective view of a first oscillating power tool with an inserted battery pack.

FIG. 1 shows a cordless power tool which in the present embodiment is an oscillating power tool 10. It is understood that it may also be another power tool, in particular a hand held power tool such as a drill or driver, a rotary hammer, an impact wrench, a router, an angle grinder, a sander, a jig saw, a reciprocating saw, a circular saw, a planer or a nailer. The oscillating power tool 10 has an elongated housing 12. The housing 12 may have a shape other than the depicted elongated one. The housing 12 may comprise two shells 14. The shells 14 are attached to each other along a plane 15. There are elements of one shell 14 that may extend across the plane 15 into the other shell 14, such as interlocking elements and screws to hold the shells 14 in position and attached to each other. The plane 15 is substantially a symmetry plane of the shells 14 as the shells 14 are in large parts symmetrical to each other, or, in other words, the plane 15 is a mounting plane of the shells 14 as the shells 14 are substantially joint along the plane 15.

At a first end of the elongated housing 12, the oscillating power tool 10 has an oscillating output shaft 16 with an accessory attachment area 18 for attaching a detachable accessory (not shown) such as a cutting blade, sanding disc or grinding tool. The middle portion of the housing 12 has a grip to hold the oscillating power tool 10 with one or two hands.

The oscillating power tool 10 is powered by a battery pack 20. The battery pack 20 is removable. The battery pack 20 is attached to the housing 12 of the oscillating power tool 10 at a battery pack attachment area 22, which is arranged on the housing 12 at a second end, opposite from the first end where the shaft 16 is arranged.

Figure 2:
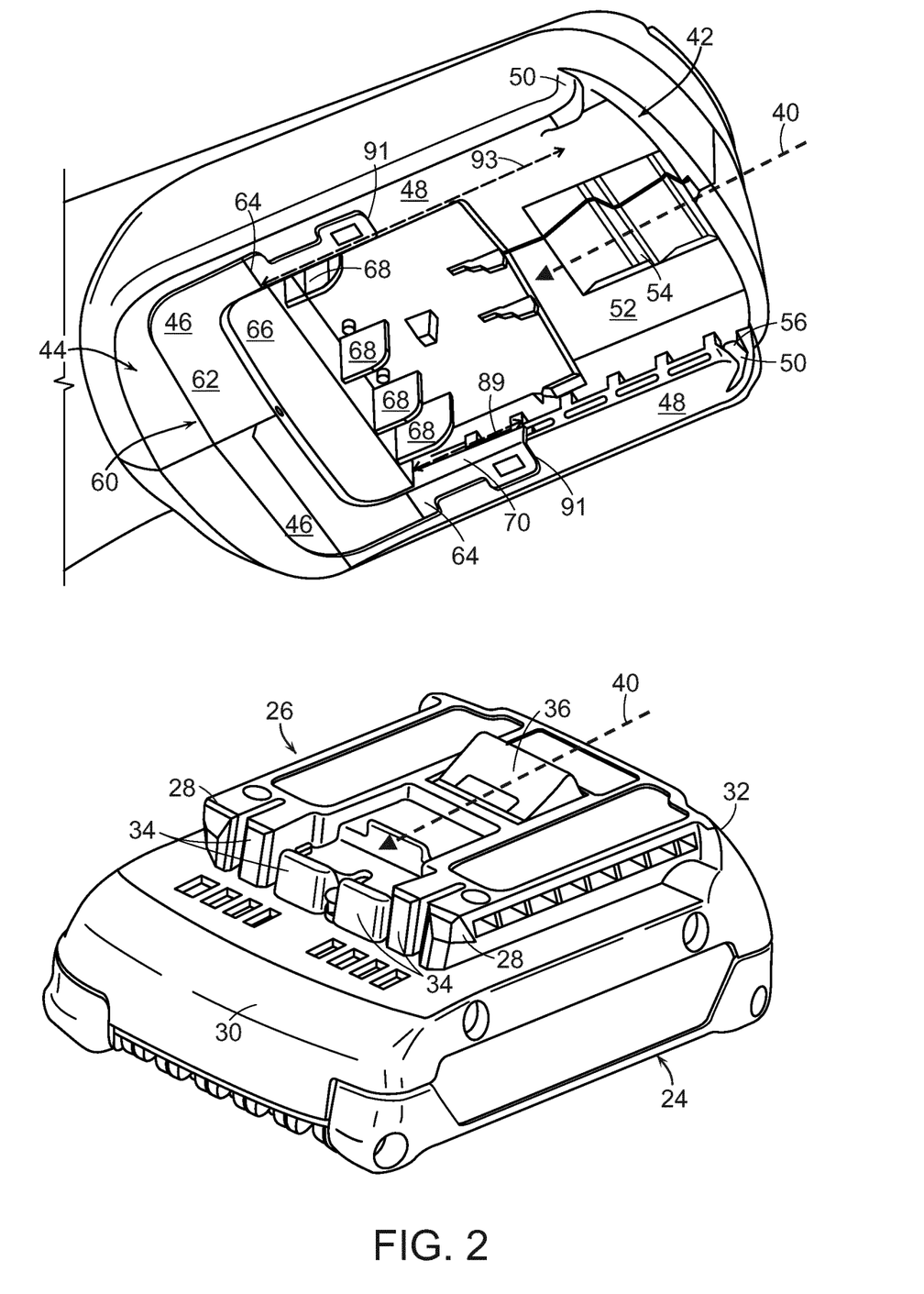
FIG. 2 is a second perspective view of the battery pack attachment area of the power tool and the removed battery pack.

FIG. 2 shows details of the interface formed by the battery pack 20 and the battery attachment area 22. The battery pack 20 comprises two main parts: a battery compartment 24 containing battery cells (not shown) and a tool attachment area 26. The battery pack 20 may also include additional components such as a circuitry and lights indicating a charging state of the battery cells. The battery pack 20 can be attached to the oscillating power tool 10 by connecting the tool attachment area 26 to the battery pack attachment area 22. The tool attachment area 26 is arranged above the battery compartment 24. The tool attachment area 26 has two parallel rails 28. The tool attachment area 26 or battery pack 20 further has a forward portion 30 and a back portion 32. The tool attachment area 26 is inserted into the battery pack attachment area 22 with the rails 28 wherein the forward portion 30 points towards the first end of the oscillating power tool 10. The battery pack 20 comprises electrical tool contacts 34 which are arranged between the rails 28 and adjacent to the forward portion 30. Between the electrical tool contacts 34 and the back portion 32 is a latching element 36 to lock the battery pack 20 to the housing 12 when the rails 28 are fully inserted into the battery pack attachment area 20. A lever 38 (FIG. 1) is arranged on the back portion 32 which unlatches the latching element 36 so the battery pack 20 can be removed. The tool attachment area 26 of the battery pack 20 is made from a glass filled polyamide or glass filled nylon. It may also be possible to use polypropylene, acrylonitrile butadiene styrene (ABS) or glass filed polycarbonate (PC).

The battery pack attachment area 22 has a battery pack insertion direction 40. The battery pack insertion direction 40 may be parallel to the plane 15. The battery pack attachment area 22 also comprises a battery pack insertion opening 42. The battery pack insertion opening 42 extends across the battery insertion direction 40. The battery pack attachment area 22 comprises an end portion 44 opposite from the battery pack insertion opening 42 in the battery pack insertion direction 40 and extends across the battery pack insertion direction 40. The end portion 44 has two first contact surfaces 46 for the forward portion 30 of the inserted battery pack 20. It is to be noted that one first contact surface 46 may be sufficient. The battery pack attachment area 22 further comprises two battery pack guide sections 48 that extend parallel to the battery pack insertion direction 40 between the battery pack insertion opening 42 and the end portion 44. The battery pack guide sections 48 are spaced apart from each other. The battery pack guide sections 48 are arranged along side walls 50 of the battery pack attachment area 22. The battery pack attachment area 22 further comprises a bottom portion 52 extending between the first side walls 50, the battery pack insertion opening 42, and the end portion 44. The bottom portion 52 has a depression 54 for the latching element 36 of the battery pack 20. The battery pack guide sections 48 and the bottom portion 52 define grooves 56 which accommodate the battery pack rails 28.

Figure 3:
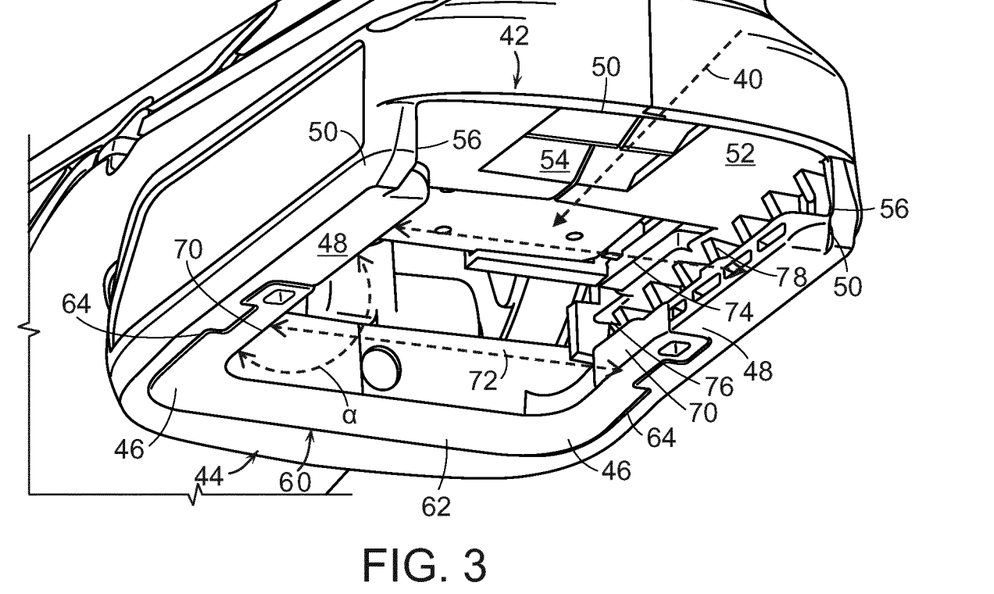
FIG. 3 is a third perspective view of the battery pack attachment area without a holder for battery pack contacts.

The battery pack attachment area 22 comprises an insert 60. The insert 60 has a U shape with a base segment 62 extending along the end portion 44 and including first contact surfaces 46. The first contact surfaces 46 of the insert 60 and the battery pack guide sections 48 define an obtuse angle α (FIG. 3). The insert 60 has two additional segments 64 that are both parallel to the battery pack insertion direction 40. The two additional segments 64 extend away from the base segment 62 and make up or, in other words, comprise parts of the battery pack guide sections 48 adjacent to the end portion 44. The two additional segments may extend all the length of the battery pack guide sections 48. It is possible to just have an insert with a base segment without the two additional segments 64.

The first contact surfaces 46 protrude from adjacent portions of the battery pack attachment area 22. This insures that the forward portion 30 of the battery pack 20 only contacts the insert 60. Each first contact surface 46 is arranged on the base segment 62 next to a respective one of the two additional segments 64. The additional segments 64 are arranged on either side of a holder 66 for battery pack contacts 68 of the oscillating power tool 10 that connect with matching electrical contacts 34 of the battery pack 20. The base segment 62 extends along the holder 66 and is arranged adjacent to the holder 66 which is arranged between the base segment 62 and the battery pack insertion opening 42.

As can be seen in FIG. 3, the two additional segments 64 have second contact surfaces for the rails 28 of the battery pack 20 and protrude from adjacent portions of the battery pack guide sections 48 of the battery pack attachment area 22. The second contact surfaces 70 are facing each other. The distance 72 between the second contact surfaces 70 is smaller than the distance 74 between the remainders of the guide sections 48 that extend between the additional segments 64 and the battery pack insertion opening 42. One of the second contact surfaces can be seen in FIGS. 2, 3 and 5 and the other second contact surface 70 can be seen in FIG. 6.

As further shown in FIG. 3, the distance 76 between the additional segments 64 and the bottom portion 52 is smaller than the distance 78 between the remainder of the battery pack guide sections 48 and the bottom portion 52 forming third contact surfaces 80 (FIG. 6) for the rails 28 of the battery pack 20.

Figure 5:
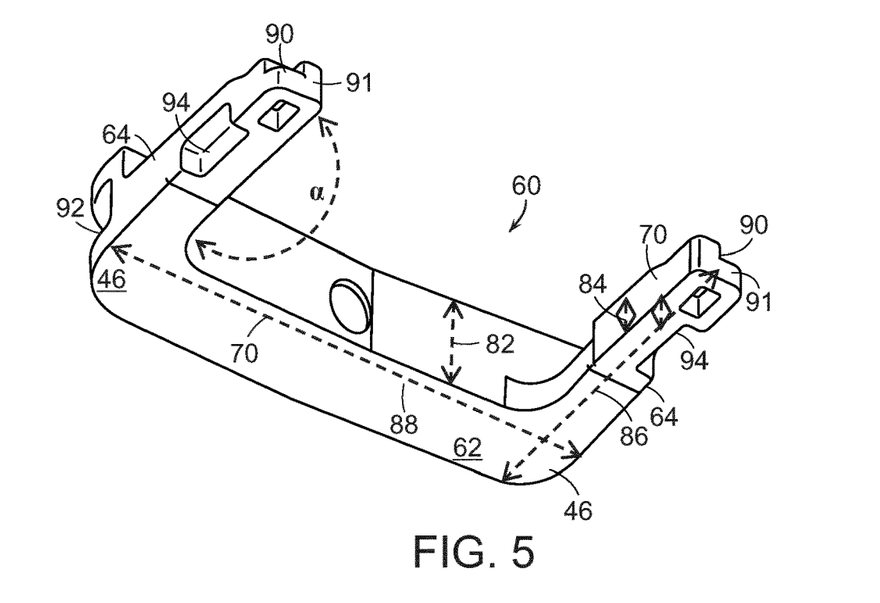
FIG. 5 is a first perspective view of the insert.

As shown in FIG. 5, extending parallel to the distances 76 and 78 or the plane 15, the base segment 62 has a first height 82 and the additional segments 64 have a second height 84. The first height 82 is bigger than the second height 84. The length 86 of the insert 60 extends parallel to the battery pack insertion direction 40 and the width 88 of the insert 60 extends parallel to the distances 72 and 74 or at a right angle to the plane 15. The length 86 is between 60% and 80% of the width 88. The length 89 of the two additional segments 64 between the holder 66 and the tips 91 of the two additional segments is between 30% and 50% of the total length 93 of the battery pack guide sections 48 (FIG. 2).

Figure 4:
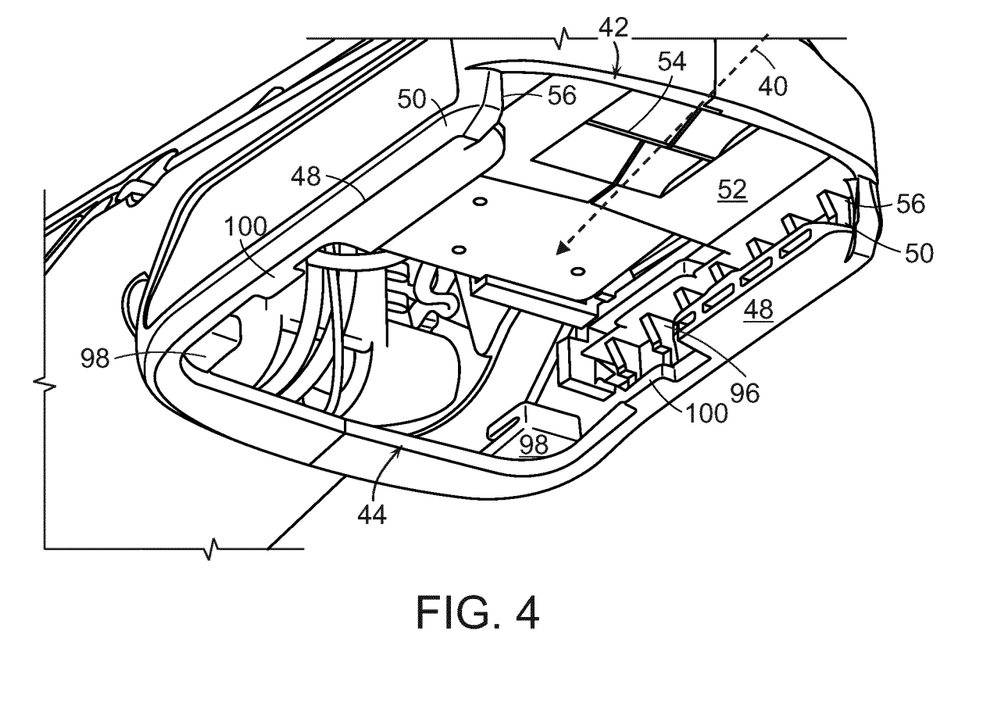
FIG. 4 is a fourth perspective view of the battery pack attachment area without an insert.
Figure 6:
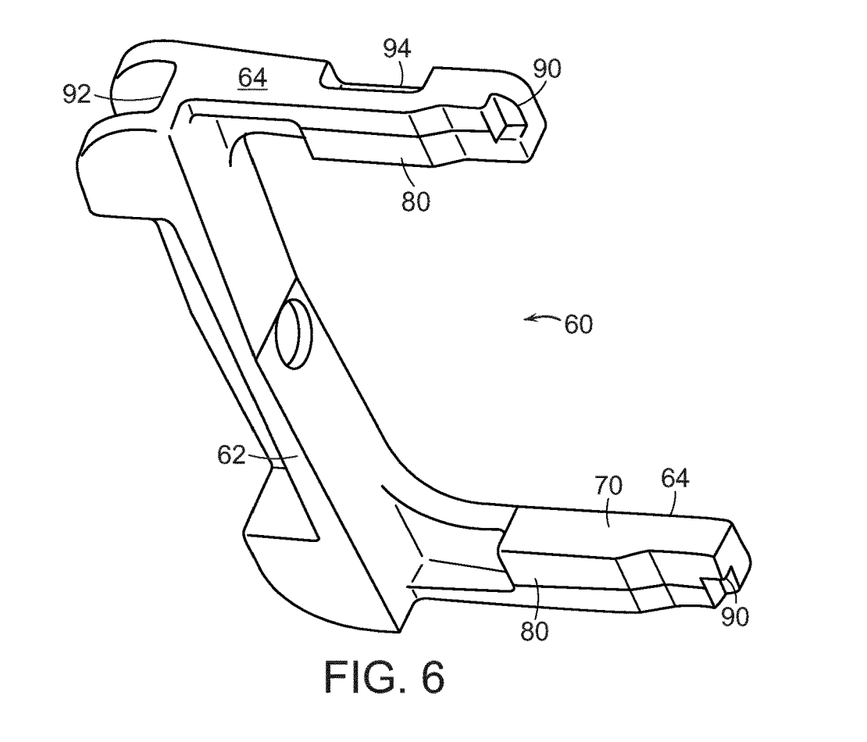
FIG. 6 is a second perspective view of the insert.

The insert 60 has pockets 90, 92, 94 for insert retaining protrusions 96, 98, 100 of the housing 12. The pockets 90, 92, 94 are arranged on the outside with respect to the U shape of the insert 60. The insert retaining protrusions 96, 98, 100 are arranged along the side walls 50. At the tip 91 of each additional segment 64, away from the base segment 62, the insert 60 has a first pocket 90 (FIGS. 5 and 6) for first insert retaining protrusions 96 (FIG. 4) of the housing 12. The first insert retaining protrusions 96 are located in the in the respective first pockets 90. The insert 60 has an outer corner area spanning each additional segment 64 and the base segment 62 and a second pocket 92 in each of those outer corner areas (FIGS. 5 and 6). The housing 12 has corresponding second insert retaining protrusions 96 (FIG. 4). The second insert retaining protrusions 96 are located in the respective second pockets 92. On each additional segment 64, the insert 60 has a third pocket 94 between the first pocket and second pocket 92. Third insert retaining protrusions 100 are arranged on the housing 12 between the first insert retaining protrusions 96 and the second insert retaining protrusions 98 and located in the respective third pockets 94.

Movement between the battery pack attachment area 22 of the oscillating power tool and the tool attachment area 26 of the battery pack 20 when fully inserted and locked may not be avoided. This is necessary so that the parts can get joined to each other. For the present disclosure it was discovered that the friction coefficient of the materials contacting each other can be influenced so as to reduce wear and heat build-up. When it comes to vibration/friction/ultrasonic welding, there are compatibility charts that show which material combinations are typically suitable to be used for these joining methods. For the present disclosure, the compatibility charts are considered in a different way. Instead of choosing the best suitable material combinations from these tables less suitable combinations are chosen. These are plastics that are chemically not compatible and therefore not recommended for plastic joining methods. These plastics are chosen as the materials for the insert 60 and the tool attachment area 26. Even if they heat up too much and melt they will not stick to each other or create a bond. The battery pack attachment area 22 may be made from a glass filled polyamide or glass filed nylon as a first material. This first material and the material of the portions of the battery pack 20 that get in contact with each other have a first coefficient of friction. The insert 60 may be made from polyoxymethylene as a second material. This second material and the material of the portions of the battery pack 20, which may be made from a glass filled polyamide or glass filed nylon, that get in contact with each other have a second coefficient of friction. The first coefficient of friction is bigger than the second coefficient of friction. The material of the insert 60 may be polyoxymethylene (POM). The material may also be acrylonitrile butadiene styrene (ABS), acrylic plastics, polycarbonate (PC), polycarbonate/poly ethylene (PC/PE), Polycarbonate/Acrylonitrile Butadiene Styrene (PC/PC), polyethylene terephthalate (PET), polypropylene (PP), polyvinyl chloride (PVC) or polytetrafluoroethylene (PTFE).

When assembling the oscillating power tool 10 the insert 60 is placed around the holder 66. Then the two components together with others, such as the motor, oscillating gear set and output shaft 16 are placed in one shell 14. Finally, the second shell 14 is joined with the one shell 14 to close the housing 12. In this way, the insert 60 is inserted into the battery pack attachment area 22 of the housing 12.

Figure 7:
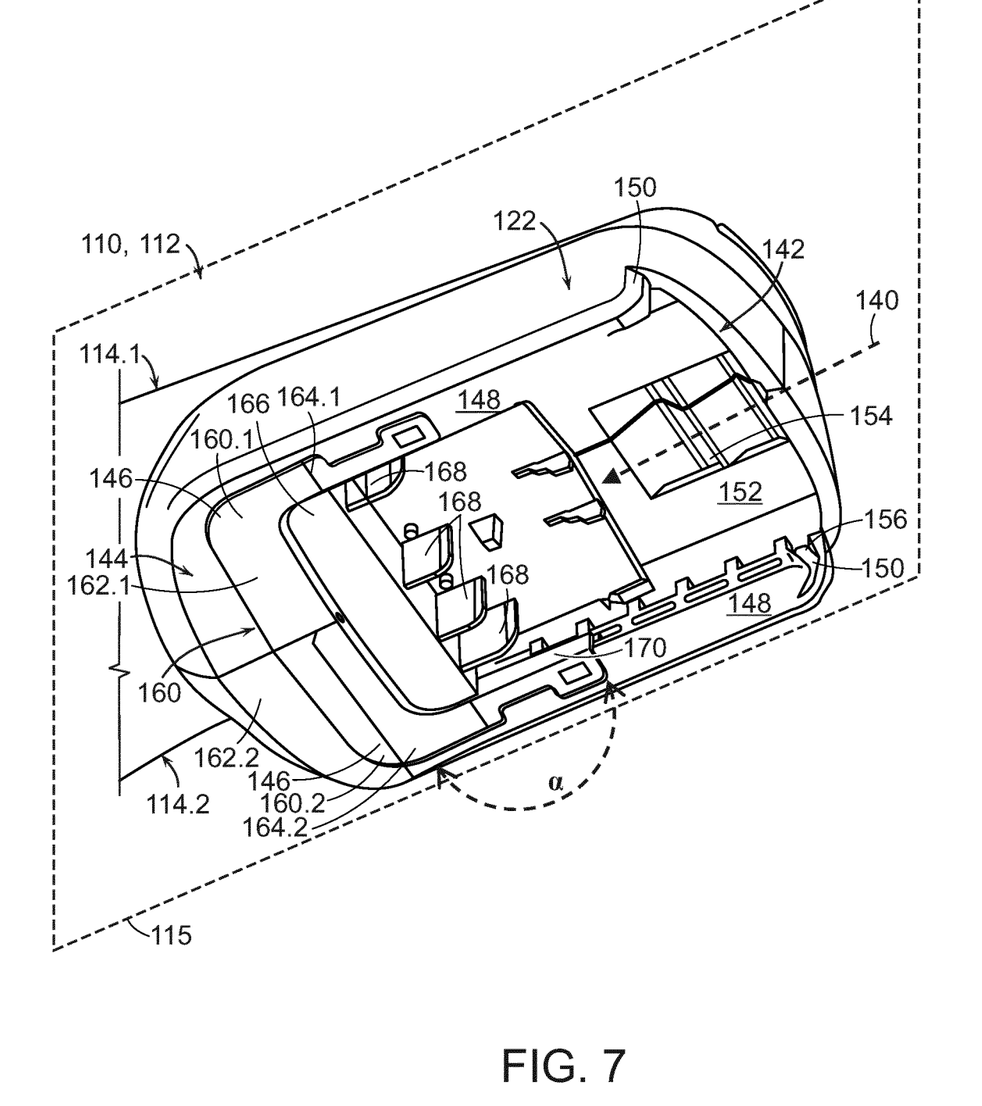
FIG. 7 is a perspective view of a second oscillating power tool without a battery pack.

FIG. 7 shows another aspect of this disclosure. An oscillating power tool 110 has a housing 112. The oscillating power tool 110 has an elongated housing 112. The housing 112 may have a shape other than the depicted elongated one. The housing 112 may comprise two shells 114.1, 114.2. The shells 114.1, 114.2 are attached to each other along a plane 115. There are elements of one shell 114.1 that may extend across the plane 115 into the other shell 114.2, such as interlocking elements and screws to hold the shells 114.1, 114.2 in position and attached to each other. The plane 115 is substantially a symmetry plane of the shells 114 as the shells 114 are in large parts symmetrical to each other, or, in other words, the plane 115 is a mounting plane of the shells 114.1, 114.2 as the shells 114.1, 114.2 are substantially joint along the plane 115.

The housing 112 further includes a battery pack attachment area 122 made from glass filled polyamide or glass filled nylon as a first material. The battery pack attachment area 122 comprises a battery pack insertion direction 140, a battery pack insertion opening 142 and an end portion 144 opposite from the battery pack insertion opening 142 in the battery pack insertion direction 140. The end portion extends across the battery pack insertion direction 140 and has two first contact surfaces 146 on either shell 114.1, 114.2 for the forward portion 30 of the battery pack 20. The battery pack 20 is the same as in FIGS. 1 and 2. The battery pack attachment area 122 comprises battery pack guide sections 148 that extend parallel to the battery pack insertion direction 140 between the battery pack insertion opening 142 and the end portion 144 and are spaced apart from each other. The first contact surfaces 146 are covered by one plate or, as shown, two separated plates 160.1, 160.2 made from a second material. The first material and the material of the battery pack 120 that get in contact with each other have a first coefficient of friction. The second material and the material of the forward portion 130 that get in contact with each other have a second coefficient of friction. The first coefficient of friction is greater than the second coefficient of friction. The plates 160.1, 160.2 extend along the first contact surfaces 146 and along parts of the battery pack guide sections 148 adjacent to the first contact surfaces 146. The shells 114.1, 114.2 are injection molded. A plate 160 is then applied to either shell 114.1, 114.2, for example in a further injection molding step.

The plates 160.1, 160.2 are made from polyoxymethylene (POM). The plates 160.1, 160.2 may also be made from acrylonitrile butadiene styrene (ABS), Polycarbonate/Acrylonitrile Butadiene Styrene (PC/PC), acrylic plastics, polycarbonate (PC), polycarbonate/poly ethylene (PC/PE), polyethylene terephthalate (PET), polypropylene (PP), polyvinyl chloride (PVC) or polytetrafluoroethylene (PTFE).

The battery pack guide sections 148 are arranged along side walls 150 of the battery pack attachment area 122. The battery pack attachment area 122 further comprises a bottom portion 152 extending between the first side walls 150, the battery pack insertion opening 142, and the end portion 144. The bottom portion has a depression 154 for the latching element 36 of the battery pack 20. The battery pack guide sections 148 and the bottom portion 152 define grooves 156 which accommodate the battery pack rails 28.

The battery pack attachment area 122 comprises the plates 160.1, 160.2. Each plate 160.1, 160.2 has an L Shape with a base segment 162.1, 162.2 extending along the end portion 144 and including the first contact surfaces 146. The first contact surfaces 146 of the plates 160.1, 160.2 and the battery pack guide sections 148 define an obtuse angle α. Each plate 160.1, 160.2 has an additional segment 164.1, 164.2, respectively that are parallel to the battery pack insertion direction 140. The additional segments 164.1, 164.2 extend away from the base segments 162.1, 162.2 and cover parts of the battery pack guide sections 148 adjacent to the end portion 144. The additional segments 164.1, 164.2 may extend all the length of the battery pack guide sections 148. It is also possible to just have a plate 160.1, 160.2 with a base segment 162 without the an additional segment 164.1, 164.2.

The first contact surfaces 146 protrude from adjacent portions of the battery pack attachment area 122. This insures that the battery pack 20 in that area only contacts the plates 160. Each first contact surface 146 is arranged on the base segment 162 adjacent the two additional segments 164. The additional segments 164 are arranged on either side of a holder 166 for battery pack contacts 168 of the oscillating power tool 110 that connect with matching electrical contacts 34 of the battery pack 20. The base segment 162 extends along the holder 166 and is arranged adjacent to the holder 166 which is arranged between the base segment 162 and the battery pack insertion opening 142.

The additional segments 164 have second contact surfaces 170 for the rails 28 of the battery pack 20 and protrude from adjacent portions of the battery pack guide sections 148 of the battery pack attachment area 122. The second contact surfaces 170 are facing each other and the distance between the second contact surfaces 170 is smaller than the distance between the remainders of the guide sections 148 that extend between the additional segments 164 and the battery pack insertion opening 142.

What is claimed is:
1. A power tool, comprising:
a housing, the housing defining in part a battery pack attachment area, the battery pack attachment area including
a battery pack insertion opening,
an end portion opposite from the battery pack insertion opening in a battery pack insertion direction and extending transversely to the battery pack insertion direction,
battery pack guide sections defined at least in part by the housing and extending parallel to the battery pack insertion direction between the battery pack insertion opening and the end portion and that are spaced apart from each other, and an insert, the insert having at least a base segment extending along the end portion and including at least one first contact surface configured to be contacted by a forward portion of an inserted battery pack.

2. The power tool of claim 1, wherein the at least one first contact surface protrudes from adjacent portions of the battery pack attachment area.

3. The power tool of claim 2, wherein the insert has two additional segments extending parallel to the battery pack insertion direction, extending away from the base segment and comprising at least parts of the battery pack guide sections adjacent to the end portion.

4. The power tool of claim 3, wherein:
the two additional segments are arranged on either side of a holder for battery pack contacts;
the base segment extends along the holder and is arranged adjacent to the holder; and
the holder is arranged between the base segment and the battery pack insertion opening.

5. The power tool of claim 4, wherein the length of the two additional segments between the holder and tips of the two additional segments closest to the battery pack insertion opening is between 30% and 50% of the total length of the battery pack guide sections.

6. The power tool of claim 3, wherein the insert comprises two first contact surfaces and each first contact surface is arranged on the base segment adjacent the two additional segments.

7. The power tool of claim 3, wherein the additional segments have two second contact surfaces for rails of the inserted battery pack and the two second contact surfaces protrude from adjacent portions of the battery pack guide sections of the battery pack attachment area.

8. The power tool of claim 7, wherein the two second contact surfaces are facing each other and a distance between the two second contact surfaces is smaller than a distance between the remainders of the guide sections that extend between the two additional segments and the battery pack insertion opening.

9. The power tool of claim 8, wherein the battery pack guide sections are arranged along first side walls of the battery pack attachment area, the battery pack attachment area further comprising a bottom portion extending between the first side walls, the battery pack insertion opening, and the end portion, wherein the battery pack guide sections and the bottom portion define grooves for the rails of the inserted battery pack, and wherein the distance between the additional segments and the bottom portion is smaller than the distance between the remainders of the battery pack guide sections and the bottom portion forming third contact surfaces for the rails of the inserted battery pack.

10. The power tool of claim 3, wherein the base segment has a first height and the two additional segments have a second height and wherein the first height is bigger than the second height.

11. The power tool of claim 3, wherein tips of the two additional segments closest to the battery pack insertion opening have respective pockets configured to receive respective insert retaining protrusions of the housing.

12. The power tool of claim 11, wherein the insert has an outer corner area on each side of the two additional segments and the base segment and a second pocket in each of those outer corner areas.

13. The power tool of claim 12, wherein the insert has a third pocket on each additional segment between the first and second pocket.

14. The power tool of claim 1, wherein the at least one first contact surface and the battery pack guide sections define an obtuse angle.

15. The power tool of claim 1, wherein the insert has pockets configured to receive insert retaining protrusions of the housing.

16. The power tool of claim 1, wherein:
the housing is made from a first material;
the insert is made from a second material;
the first material and third material of the portions of the inserted battery pack that get in contact with each other have a first coefficient of friction;
the second material and fourth material of the portions of the inserted battery pack that get in contact with each other have a second coefficient of friction; and
the first coefficient of friction is bigger than the second coefficient of friction.

17. The power tool of claim 16, wherein the second material of the insert is one of polyoxymethylene (POM), acrylonitrile butadiene styrene (ABS), Polycarbonate/Acrylonitrile Butadiene Styrene (PC/PC), acrylic plastics, polycarbonate (PC), polycarbonate/poly ethylene (PC/PE), polyethylene terephthalate (PET), polypropylene (PP), polyvinyl chloride (PVC) and polytetrafluoroethylene (PTFE).

18. A power tool having a housing, the housing made from a first material and defining in part a battery pack attachment area, the battery pack attachment area comprising
a battery pack insertion opening;
an end portion opposite from the battery pack insertion opening in a battery pack insertion direction and extending across the battery pack insertion direction, the end portion having at least one first contact surface for a forward portion of an inserted battery pack; and
battery pack guide sections that extend parallel to the battery pack insertion direction between the battery pack insertion opening and the end portion and that are spaced apart from each other;
wherein the at least first contact surface is made from a second material,
wherein the first material and third material of the inserted battery pack that get in contact with each other have a first coefficient of friction,
wherein the second material and fourth material of the forward portion that get in contact with each other have a second coefficient of friction, and
wherein the first coefficient of friction is greater than the second coefficient of friction.

19. The power tool of claim 18, wherein the second material is an injection molded part that extends along the at least one first contact surface and along parts of the battery pack guide sections adjacent to the at least one first contact surface.

20. The power tool of claim 18, wherein the second material is one of polyoxymethylene (POM), acrylonitrile butadiene styrene (ABS), Polycarbonate/Acrylonitrile Butadiene Styrene (PC/PC), acrylic plastics, polycarbonate (PC), polycarbonate/poly ethylene (PC/PE), polyethylene terephthalate (PET), polypropylene (PP), polyvinyl chloride (PVC) and polytetrafluoroethylene (PTFE).

* * * * *